US011100558B1

(12) United States Patent
Chanda et al.

(10) Patent No.: US 11,100,558 B1
(45) Date of Patent: Aug. 24, 2021

(54) RECOMMENDATIONS UTILIZING NOISE DETECTION AND FILTERING

(71) Applicant: Amazon Technologies, Inc., Seattle, WA (US)

(72) Inventors: Gaurav Chanda, Sammamish, WA (US); Sanjeev Jain, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 716 days.

(21) Appl. No.: 15/600,540

(22) Filed: May 19, 2017

(51) Int. Cl.
*G06Q 30/00* (2012.01)
*G06Q 30/06* (2012.01)
*G06Q 30/02* (2012.01)
*H04L 29/08* (2006.01)
*G06N 20/00* (2019.01)

(52) U.S. Cl.
CPC ......... *G06Q 30/0631* (2013.01); *G06N 20/00* (2019.01); *G06Q 30/0201* (2013.01); *G06Q 30/0202* (2013.01); *H04L 67/2833* (2013.01)

(58) Field of Classification Search
CPC .......... G06Q 30/0631; G06Q 30/0201; G06Q 30/0202; H04L 67/2833; G06N 20/00
USPC .............................................. 705/26.1–27.2
See application file for complete search history.

(56) References Cited

U.S. PATENT DOCUMENTS

2011/0238474 A1* 9/2011 Carr ................. G06Q 20/10
705/14.23
2020/0344313 A1* 10/2020 Bolivar ............. H04L 67/306

OTHER PUBLICATIONS

Brick-and-mortar retailers snatching customers away from E-tailers. (Feb. 16, 2012). PR Newswire Retrieved from https://dialog.proquest.com/professional/docview/1346330115?accountid=142257 (Year: 2012).*

* cited by examiner

*Primary Examiner* — Anand Loharikar
(74) *Attorney, Agent, or Firm* — Knobbe Martens Olson & Bear LLP

(57) ABSTRACT

A recommendation service that utilizes a machine learning algorithm trained with association vectors is provided. To allow for filtering of unrelated items, a recommendation service generates vectors that represent a quantization of items within a browse node that are considered complementary or a substitute of a selected item. Using an association vector, a machine learning algorithm can be trained to determine whether a particular item recommendation is considered noise, complementary or a substitute. Thereafter, the recommendation service can utilize the trained machine learning algorithm to filter a set of recommendations to remove items considered to be noise or to prioritize items identified as complementary or a substitute.

16 Claims, 6 Drawing Sheets

RECOMMENDATIONS UTILIZING NOISE DETECTION AND FILTERING

BACKGROUND

Generally described, organizations operate computer networks that interconnect numerous computing systems in support of the organizations' operations. Data centers may house significant numbers of interconnected computing systems, such as private data centers operated by a single organization and public data centers operated by third parties to provide computing resources to customers. Public and private data centers may provide network access, power, hardware resources (e.g., computing and storage), and secure installation facilities for hardware owned by an organization or its customers.

To facilitate increased utilization of data center resources, virtualization technologies allow a single physical computing machine to host one or more instances of virtual machines that appear and operate as independent computing machines to a connected computer user. With virtualization, a single physical computing device can create, maintain, or delete virtual machines in a dynamic manner. In turn, users can request computing resources from a data center and be provided with varying numbers of virtual machine resources on an "as needed" or "as requested" basis. In addition to virtual machines, a data center may provide other computing resources, including hardware computing capacity, data storage space, network bandwidth, and the like.

In some environments, client computing devices may interact with data center resources to request content, such as Web pages or other content. In such embodiments, the service provider, referred to as a content provider, may provide content responsive to request from client computing devices. The responsive content can include recommendations for items or services available for selection via the requested content, such as selectable display objects.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
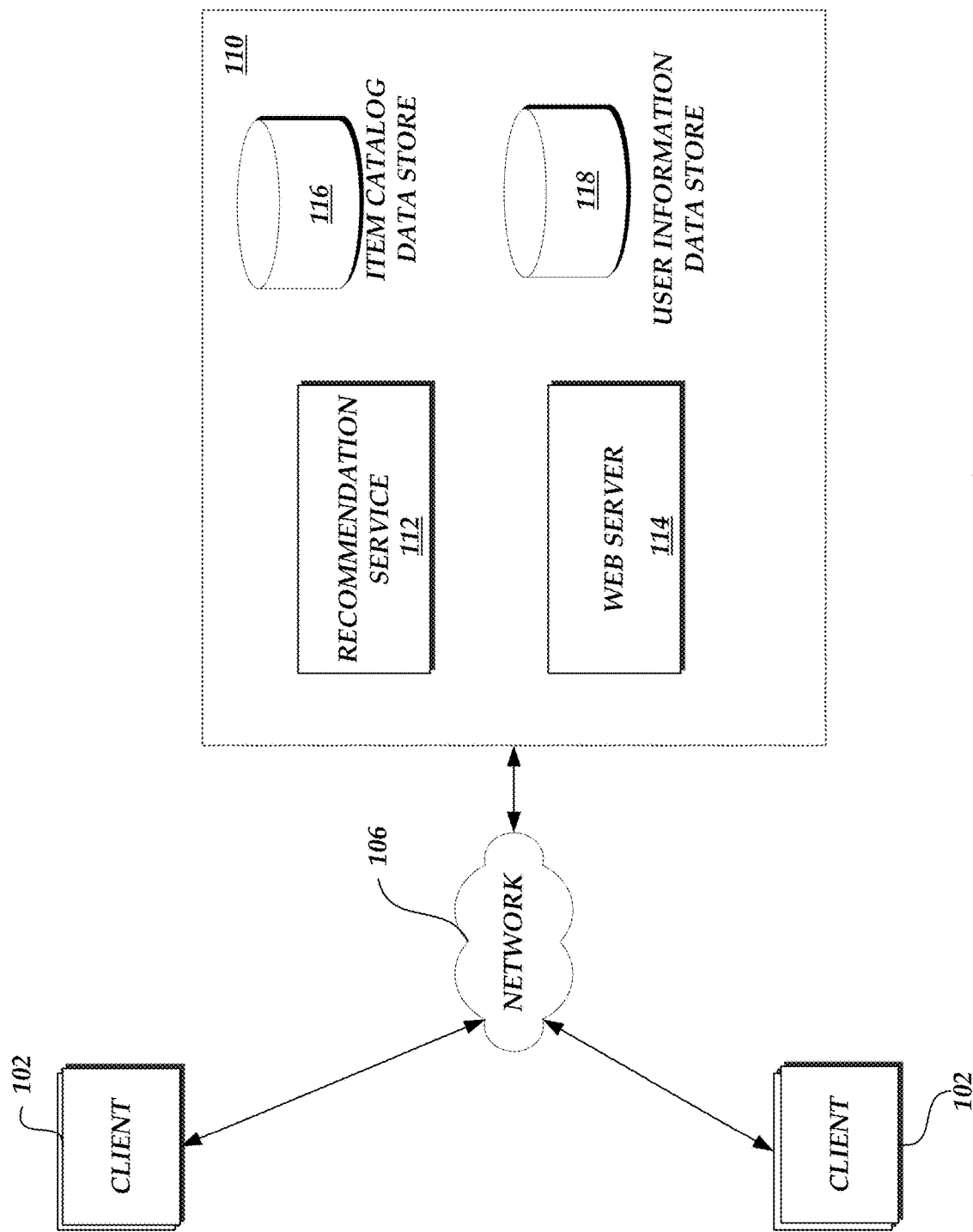
FIG. 1 is a block diagram depicting an illustrative logical network including multiple client computing devices and a service provider network.

Generally described, the present application corresponds to the generation of content. More specifically, aspects of the present application relate to the processing of content requests to include recommendations. Illustratively, one or more client computing devices can utilize a browser application or browsing application functionality to request content provided by a content provider via a communication network. In one embodiment, the content generated by the content provider, such as a Web page, can include recommendations for items or services selected for the requesting user.

Illustratively, the content provider can access a recommendation service that generates a set of recommended items. In one aspect, the recommendation service can utilize information about the user to generate a set of recommendation items. For example, the recommendation service can identify one or more items associated with the user that will function as the "seed" items for the recommendation service. Such seed items may be selected from user profiles that identify items purchased by users, items associated with a browse history, items included in wishlists, items included in reviews or ratings, search terms or search criteria, and the like. Using a set of seed items, the recommendation service can identify one or more additional items that are associated with the seed items to form the set of recommended items. The recommendation service can then implement a number of specific recommendation formation approaches (e.g., execution of one or more recommendation formation algorithms), or combination of recommendation formation approaches, to form the set of recommended items.

In accordance with an item-to-item contextual recommendation formation embodiment, the recommendation service can utilize historical user behavior (e.g., purchase histories, online behavior, etc.) for a set of users to identify relationships between items. More specifically, by monitoring user behavior for a set of users, often a large set of users, an illustrative item-to-item contextual recommendation approach generates a matrix (or set of matrices) that quantifies the relative association of a selected item (e.g., the seed item) to other items. The item-to-item contextual recommendation approach does not necessarily understand the basis for the association, but instead looks to statistically significant behavior over the set of observed behavior (e.g., customers who purchased sun tan lotion also purchased flip flops, bubble gum, and paper towels). For larger sets of observed behavior, specific values in the matrix (or matrices) are influenced by repeated customer behavior that corresponds to a statistically significant number of observations (e.g., surpassing an established threshold). With reference to the previous example, the association between sun tan lotion and bubble gum may be considered to have a higher association value based on the number of users that happen to have purchase both items.

In some embodiments, however, an item-to-item contextual recommendation approach can be influenced by observed behavior that may be statistically significant, but may represent anomalies, generally referred to as "noise" (e.g., customers who purchased shoe laces also purchased jelly beans) Since item-to-item contextual recommendation approach are driven by historical observations, there is the potential that smaller data sets (e.g., a lower amount of observed behavior) or some coincidental occurrences can result in the incorrect association of items. Such noise can result in the generation of recommendations from an item-to-item contextual recommendation approach that includes recommended items that may be more likely to be considered as not complementary or a substitute to the seed item.

In accordance with an aspect of the present application, a recommendation service utilizes a machine learning algorithm that can be trained with vectors representative of complementary or substitute/equivalent item relationships between items. Utilizing browse node information that corresponds to a grouping of items according to a hierarchical organization of content for a given catalog of items, the vectors include a quantization of items within a browse node that are considered complementary or a substitute of a selected item (e.g., the seed item). The vector also includes a quantization of items outside the browse node, such as at least a remaining portion of the browse node, that would be considered to have no relation to the seed item and which can be characterized as noise. Using the generated vector, the machine learning algorithm can be trained to determine whether a particular item recommendation is considered noise, complementary or a substitute. In one embodiment, the association vector may be unique to a set of individuals or generic to a larger group of individuals. In other embodiments, the association vector can be focused to individual users or sets of users. Thereafter, the recommendation service can utilize the trained machine learning algorithm to process a potential set of recommendations to prioritize items (e.g., complementary items) or to filter out items (e.g., items considered to be noise).

Although aspects of some embodiments described in the disclosure will focus, for the purpose of illustration, on the illustrative interactions for requesting browser content and illustrative screen displays, one skilled in the relevant art will appreciate that the examples are illustrative only and are not intended to be limiting. Still further, although aspects of the present application will be described with regard to illustrative item-to-item contextual recommendation algorithms or embodiments, one skilled in the relevant art will appreciate that the present application is not limited to particular recommendation algorithms and may be incorporated in various alternative or modified recommendation algorithms or embodiments. Still further, one or more aspects of the present application may also be utilized in conjunction with other recommendation or prioritization embodiments, such as sorting search query strings, prioritizing display objects, and the like.

FIG. 1 is a block diagram depicting an illustrative logical network 100 including multiple client computing devices 102 and a service provider network 106 in communication via a network 106. The client computing devices 102 may be geographically distant, and independently owned or operated. Accordingly, the groupings of client computing devices 102 within FIG. 1 is intended to represent a logical, rather than physical, grouping. Similarly, while one set of illustrative components is shown to represent the service provider system 110, multiple instances of each component may be present within the service provider system 110, and such components may be located within geographically diverse areas (e.g., globally, continentally, or regionally), in order to provide a wide geographical presence for the service provider system 110.

Network 106 may be any wired network, wireless network, or combination thereof. In addition, the network 106 may be a personal area network, local area network, wide area network, cable network, satellite network, cellular telephone network, or combination thereof. In the example environment of FIG. 1, network 106 is a global area network (GAN), such as the Internet. Protocols and components for communicating via the other aforementioned types of communication networks are well known to those skilled in the art of computer communications and thus, need not be described in more detail herein. While each of the client computing devices 102 and the service provider system 110 is depicted as having a single connection to the network 106, individual components of the client computing devices 102 and service provider system 110 may be connected to the network 106 at disparate points.

Client computing devices 102 may include any number of different computing devices capable of communicating with the service provider system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Each client computing device may include one or more data stores (not shown in FIG. 1) including various applications or computer-executable instructions, such as web browsers, used to implement the embodiments disclosed herein. An illustrative example of a client computing device 102 will be described with regard to FIG. 3

In accordance with embodiments, the service provider system 110 includes a set of services for implementing one or more aspects of the present application. As described in further detail below, the service provider system 110 can include one or more computing devices for implementing a recommendation service 112. Illustratively, the recommendation service 112 can process requests for a set of recommendations based on submitted seed items, as described below. The service provider system 110 can also include one or more computing devices for implementing a web server 114, which corresponds to one or more content providers. Illustratively, the web server 114 can host one or more process requests for content from the client computing devices 102. Although illustrated as being part of the service provider 110, one or more third party content provider components or services may be utilized in the manner described below.

As further illustrated in FIG. 1, the service provider system 110 can include an item catalog data store 116 that maintains information related to one or more items that can be recommended to requesting users, one or more items that can be identified in gaming media streams, or a combination thereof. The service provider system 110 can also include a user information data store 118 that corresponds generally to one or more data stores for maintaining personalization information related to user social network networks, purchase histories, browsing history, preferences, and the like. Additionally, the user information data store 118 can maintain profile information associated with the identification and validation of users, such as account data, passwords, financial or transaction information, biographical information and the like. Generally, the item catalog data store 118 and user information data store 118 represent one or more data stores that can provide or maintain information related to one or more aspects of the present application.

It will be appreciated by those skilled in the art that the service provider system 110 may have fewer or greater components than are illustrated in FIG. 1. Thus, the depiction of the service provider system 110 in FIG. 1 should be taken as illustrative. For example, in some embodiments, components of the service provider system 110, such as the recommendation service 112 and the web server 114 may be executed by one more virtual machines implemented in a hosted computing environment. Additionally, item catalog data store 116 and the user information data store 118 may correspond to multiple physical or virtual computing resources that may logically represented as a single component, but may be implement in a distributed manner. Likewise, one or more services or data stores may be associated with additional third parties.

Figure 2:
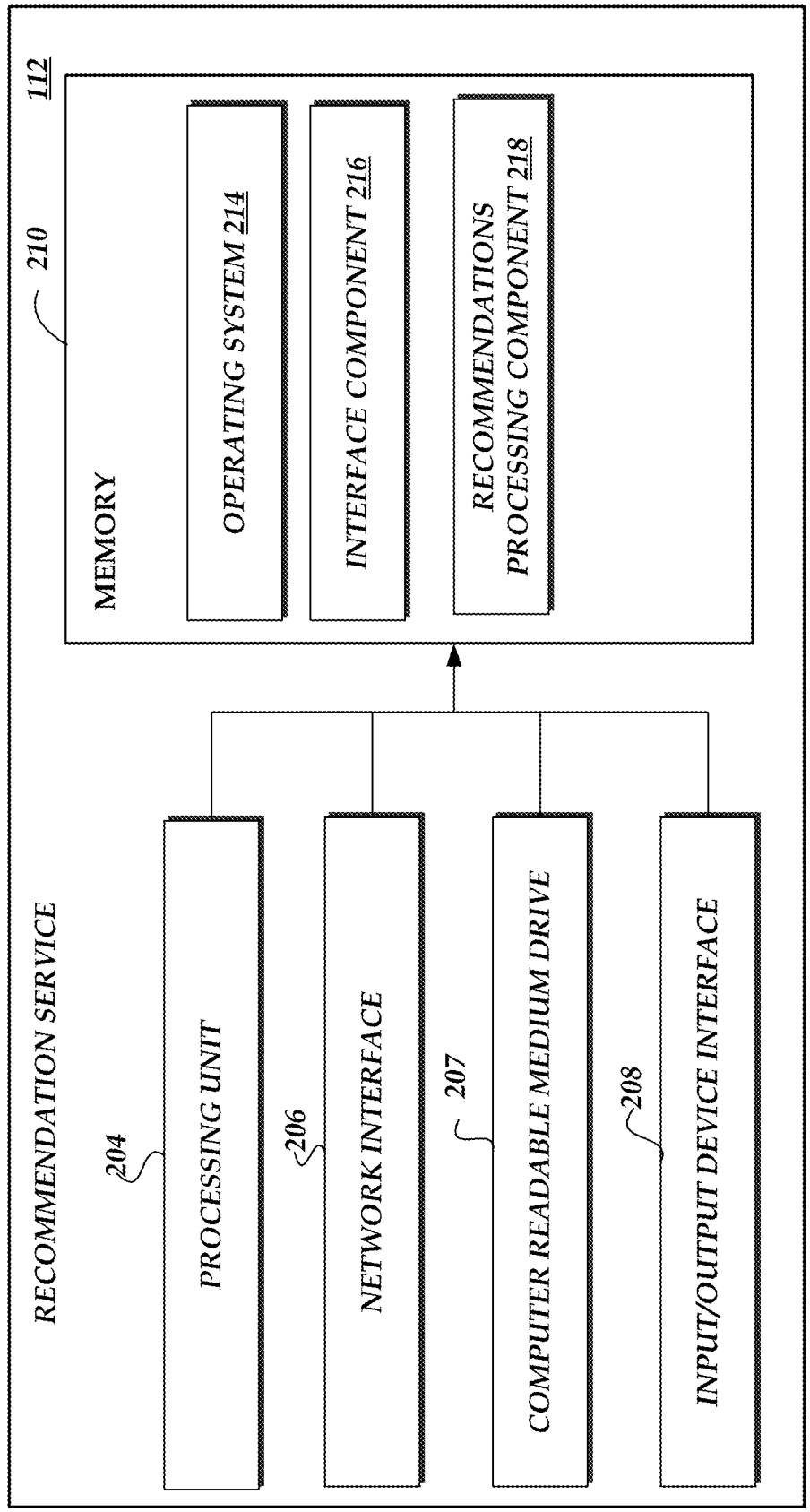
FIG. 2 is a block diagram of illustrative components of a recommendation service for generating recommendations utilizing item association vectors in accordance with the present application.

FIG. 2 depicts one embodiment of an architecture of a computing device illustrative of a recommendation service 112 that receives and processes requests from viewing client computing devices 102 in accordance with the present application. The general architecture of the computing device for implementing the recommendation service 112 depicted in FIG. 2 includes an arrangement of computer hardware and software components that may be used to implement aspects of the present disclosure. As previously described, one or more aspects of the recommendation service 112 may be implemented in a virtualize environment provided by a hosting environment. As illustrated, the computing device includes a processing unit 204, a network interface 206, a computer readable medium drive 207, an input/output device interface 208 (which may be omitted), all of which may communicate with one another by way of a communication bus.

The network interface 206 may provide connectivity to one or more networks or computing systems, such as the network 106 of FIG. 1. The processing unit 204 may thus receive information and instructions from other computing systems or services via a network. The processing unit 204 may also communicate to and from memory 210 and further provide output information. In some embodiments, the hosting environment may include more (or fewer) components than those shown in FIG. 2.

The memory 210 may include computer program instructions that the processing unit 204 executes in order to implement one or more embodiments. The memory 210 generally includes RAM, ROM or other persistent or non-transitory memory. The memory 210 may store an operating system 214 that provides computer program instructions for use by the processing unit 204 in the general administration and operation of the computing device. The memory 210 may further include computer program instructions and other information for implementing aspects of the present disclosure. For example, in one embodiment, the memory 210 includes an interface component 216 that can interface with corresponding content providers, such as web server 114, to receive requests for recommendations. Additionally, in some embodiments, the memory 210 can include a recommendation processing component 218 to generate recommendations, such as by implementing an item-to-item contextual recommendation algorithm, as described herein. Additionally, the recommendation processing component can implement a machine learning algorithm trained according to association vectors to process or otherwise filter potential recommendations. Each of the components associated with the recommendation service 112 may implement the functionality or function to interface with additional or external components to implement the related function.

Figure 3:
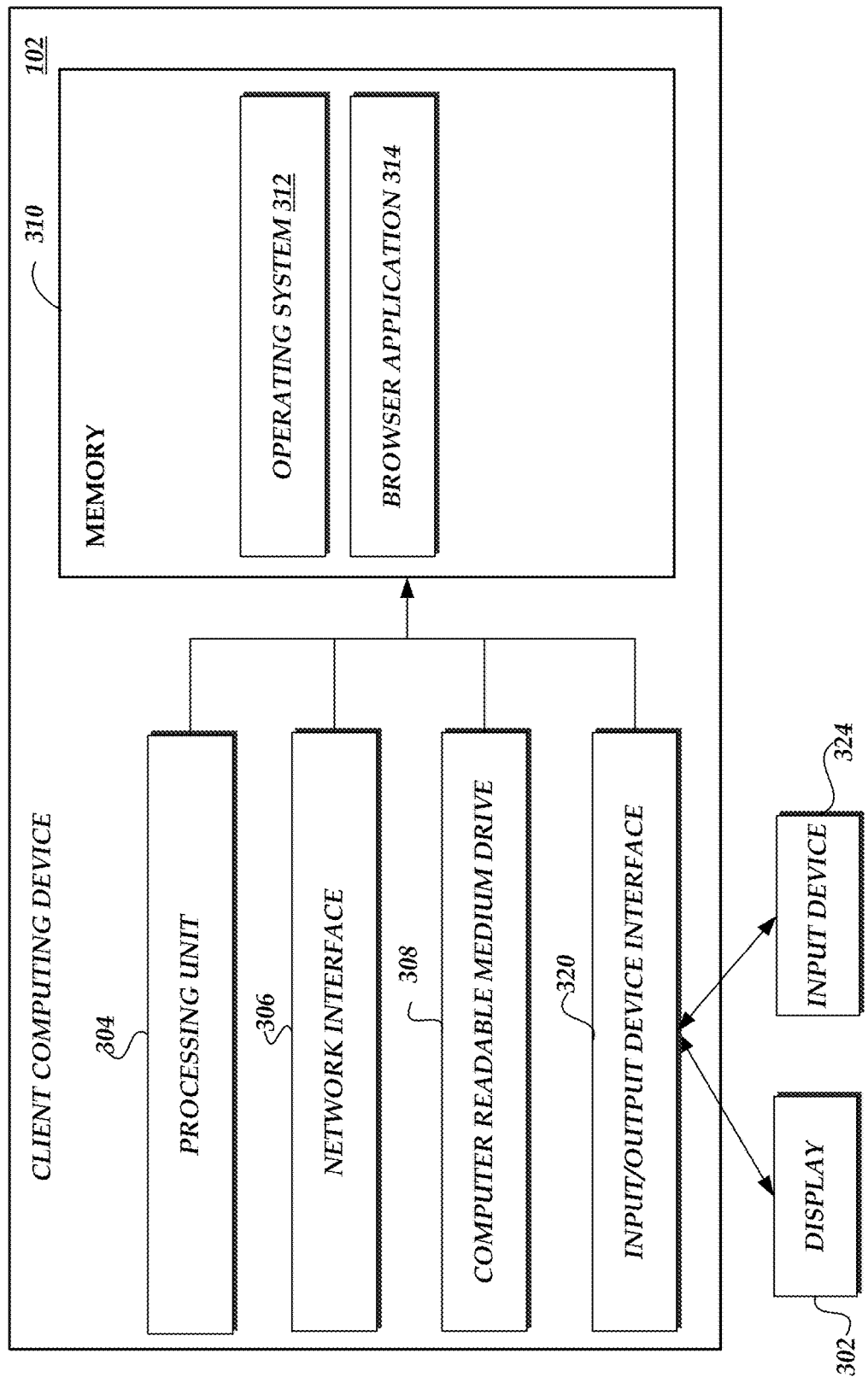
FIG. 3 is a block diagram of illustrative components of a client computing device for requesting and processing content in accordance with the present application.

FIG. 3 depicts one embodiment of an architecture of an illustrative a client computing, illustratively viewing client computing device 102, that can generate requests for content in accordance with the present application. The general architecture of the client computing device 102 depicted in FIG. 3 includes an arrangement of computer hardware and software components that may be used to implement aspects of the present disclosure. As illustrated, the viewing client computing device 102 includes a processing unit 304, a network interface 306, a computer readable medium drive 308, an input/output device interface 320, one or more output devices 322 (e.g., a display), and one or more input devices 324 (e.g., keyboard or touch screen), all of which may communicate with one another by way of a communication bus. The network interface 306 may provide connectivity to one or more networks or computing systems, such as the network 106 of FIG. 1. The processing unit 304 may thus receive information and instructions from other computing systems or services via a network.

The memory 310 may include computer program instructions that the processing unit 304 executes in order to implement one or more embodiments. The memory 310 generally includes RAM, ROM or other persistent or non-transitory memory. The memory 310 may store an operating system 312 that provides computer program instructions for use by the processing unit 304 in the general administration and operation of the user computing device 104. The memory 310 may further include computer program instructions and other information for implementing aspects of the present disclosure. For example, in one embodiment, the memory 310 includes a browser application 314, or other software application, for accessing content and communicating with and processing information from the web server 114.

Figure 4:
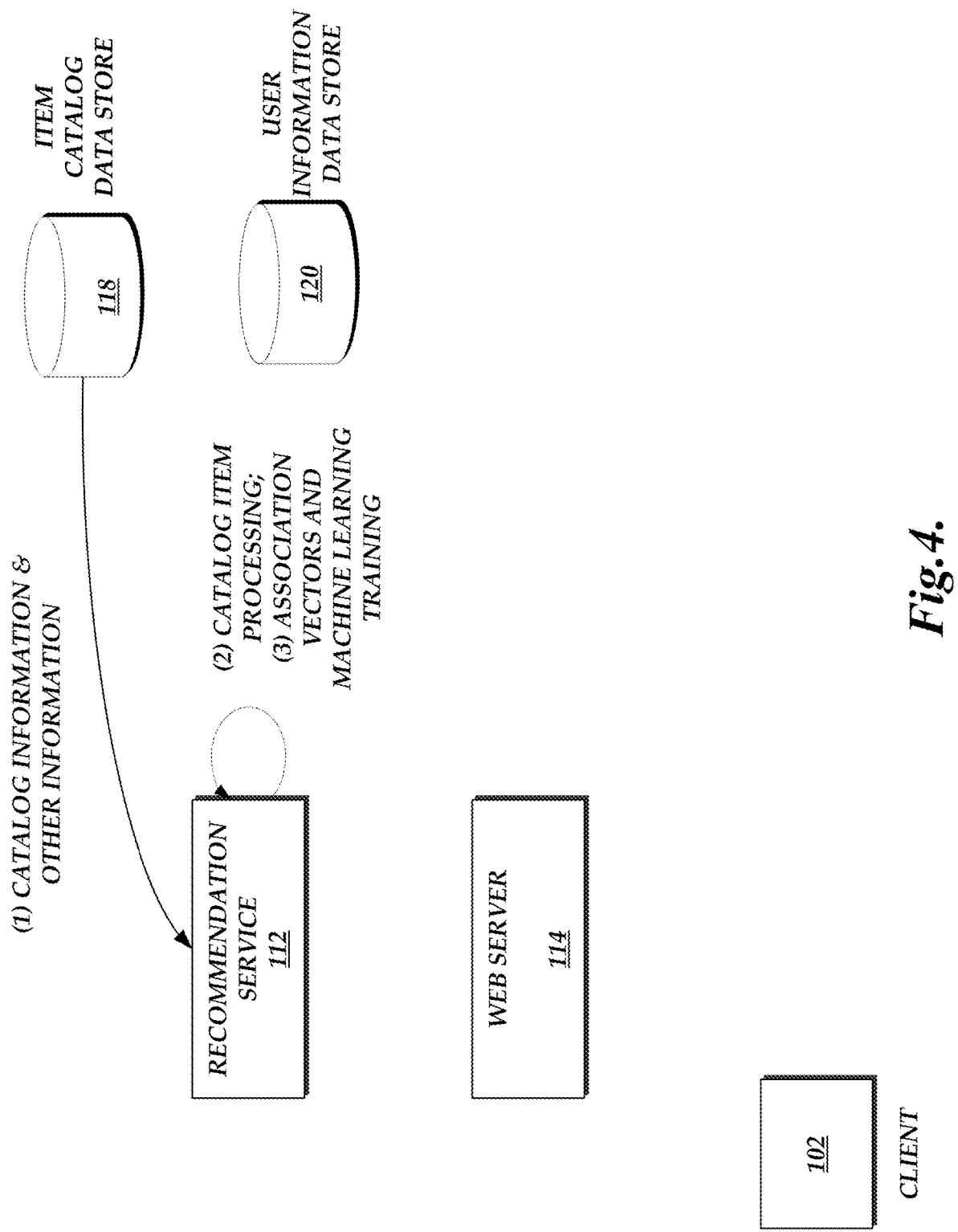
FIG. 4 is a block diagram of the logical network of FIG. 1 illustrating the generation of item association vectors in accordance with the present application.

Turning now to FIG. 4, illustrative interactions between the components of the logical network 100 in processing generating association vectors for training the machine learning algorithm implemented by the recommendation processing component 218 will be described. At (1), the recommendation service 112 can obtain catalog information, from the item catalog data store 118. Illustratively, the catalog information can correspond to browse node information that identifies a hierarchical organization of one or more items in the catalog organized by hierarchical criteria. For example, in the context of a catalog of items for sale, the browse tree nodes can correspond to categories of items, such as sporting goods, kitchenware, etc. The catalog information can include historical information such as purchase information, browsing information or other user interaction information that can be utilized to generate association vectors as described herein.

At (2), the recommendation service 112, such as through the recommendation processing component 218, processes the catalog information to determine one or more unique association vectors for items. Illustratively, the association vectors can correspond to a quantization of relationships between items in the catalog. Such relationships can include a quantization of items that are complementary. Such a quantization can be based on items within a common browse node that are purchased together in a statistically significant manner. The relationships can also include a quantization of items that are substitutes or equivalents. Such a quantization can be based on browsing session information to identify items that may be considered substitutes or are otherwise interchangeable. The relationships can further include a quantization of items that are considered to be noise or statistically non-related. Such a quantization can be based on items included in the catalog but not associated with a selected browse node. Additionally, the catalog information may correspond to a large number of users. In other embodiments, the catalog information may be unique to one or more identified users, such that the observed behavior or quantized values can be attributable to the specific users.

Generally described, the recommendation service 112 can generate vectors of quantization values for various browse nodes or portions thereof. Illustratively, the vector can include one or more rows and one or more columns of items in a browser node. For each row, a set of quantization values are provided for the relationship between an identified item in the browse node and additional items in the browse node (e.g., the columns of items). For example, in a browse node corresponding to hair care products can include rows and columns of quantization values for the relationships between shampoos, conditioners, oils, gels, and the like. Illustratively, the quantization values can be provided to distinguish between different types or characterizations of the relationships, such as complementary, substitute or noise. The quantization values can also reflect a degree of confidence for the characterization of the relationship. The generation of the quantization values may be done automatically by the recommendation service 112, such as by processing the catalog information and correlating the purchase history information. In other embodiments, the recommendation service 112 can utilize manual specification of the quantization values or manual adjustment of calculated quantization values. If multiple association vectors may be utilized, the recommendation service 112 can generate a plurality of association vectors to be applicable to individual users or one or more subsets of users.

At (3), the recommendation service 112 utilizes the generated association vectors to train a machine learning algorithm. Illustratively, the machine learning algorithm can be trained with the association vectors for the recommendation service 112 to identify item recommendations from an item-to-item contextual recommendation that would be considered possible noise (e.g., brownie mix and hammers). In another embodiment, the machine learning algorithm can be trained to identify item recommendations from an item-to-item contextual recommendation that would be considered complementary. In a further embodiment, the machine learning algorithm can be trained to identify item recommendations from an item-to-item contextual recommendation that would be considered a substitute. As will be explained below, once trained, the recommendation service 112 can utilize the trained machine learning algorithm to filter a set of recommendations to remove items considered to be noise or to prioritize items identified as complementary or a substitute. As previously described, the machine learning algorithms can be trained to cover a larger subset of potential users (or generic to all users). In other embodiments, the machine learning algorithms can be trained using multiple association algorithms to specific users or groups of users. Additionally, as also mentioned previously, in other embodiments, the recommendation service 112 can utilize the trained machine learning algorithm to filter other information, such as search terms, display objects and the like, considered to be noise or to prioritize items identified as complementary or a substitute.

Figure 5:
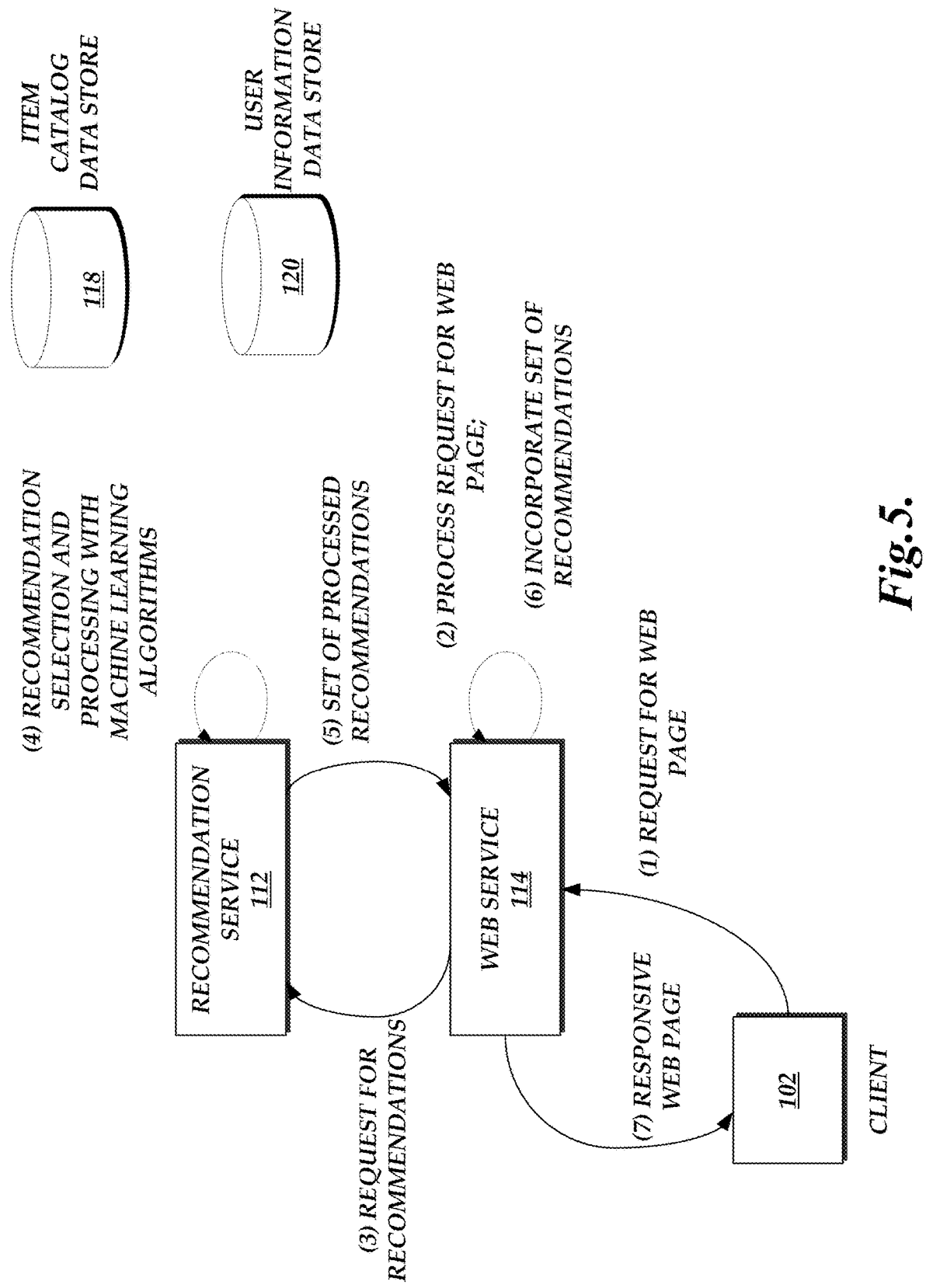
FIG. 5 is a block diagram of the logical network of FIG. 1 illustrating the requesting and processing of content requests in accordance with the present application.

Turning now to FIG. 5, illustrative interactions between the components of the logical network 100 in processing using a machine learning algorithm trained with associated vectors by the recommendation processing component 218 will be described. At (1), a client computing device 102 transmits a request for content, such as to web server 114. The request can include various information identifying the requested content, such as Web page. Additionally, the request can include various identification information, such as user identifiers, session identifiers, login information, passwords, and the like. The identification information can be transmitted as part of the request, included as part of handshaking or authentication protocol, or otherwise exchanged between the client computing device 102 and the web server 114. At (2), the web server 114 can process the request to identify the requested content. Additionally, the web server 114 can access or request profile information for allowing for the customization of the requested content. Additionally, for purposes of the present application, the web server 114 can access profile information that identifies one or more items that can be identified for recommendations or otherwise utilized as seed items for a set of recommendations. As described above, the profile information can include, but is not limited to, purchase history, browse history, wishlist, rating or reviews, and the like.

In embodiments in which the web server will include recommended items as part of the responsive content, at (3), the web server 114 transmits a request to the recommendation service 112. Illustratively, the request can include the seed items utilized for the recommended items or can identify the profile information (and grant permission) for the recommendation service 112 to access. At (4), the recommendation service 112 obtains the requests and can identify a set of recommendations. For example, the recommendation service 112 can implement an item-to-item contextual recommendation approach that identifies statistically significant items from a matrix. In other embodiments, the recommendation service 112 can implement other types of recommendation approaches or variations to an item-to-item contextual recommendation approach. Additionally, the recommendation service 112 can further process the set of recommendations. In one embodiment, the recommendation service 112 can filter the set of recommendations by utilizing the trained machine learning algorithm to identify one or more items that are considered to be noise or characterized as non-relevant. In another embodiment, the recommendation service 112 can prioritize the set of recommendations by utilizing the trained machine learning algorithm to identify (or rank) one or more items considered to be complementary, substitute or both. The recommendation service 112 can vary the prioritization based on the characterization (e.g., complementary items may be ranked higher). At (5), the recommendation service 112 returns the processed set of recommended items.

At (6), the web server 114 processes the received recommendations as part of the responsive content. For example, the web server 114 can cause at least one of the recommended items to be included in the responsive content, such as by creating display objects for the recommended items. At (7), the web serve 114 transmits the requested content to the client computing device 102. The client computing device 102 can then render the requested content, which can include the display of the processed recommended items.

Figure 6:
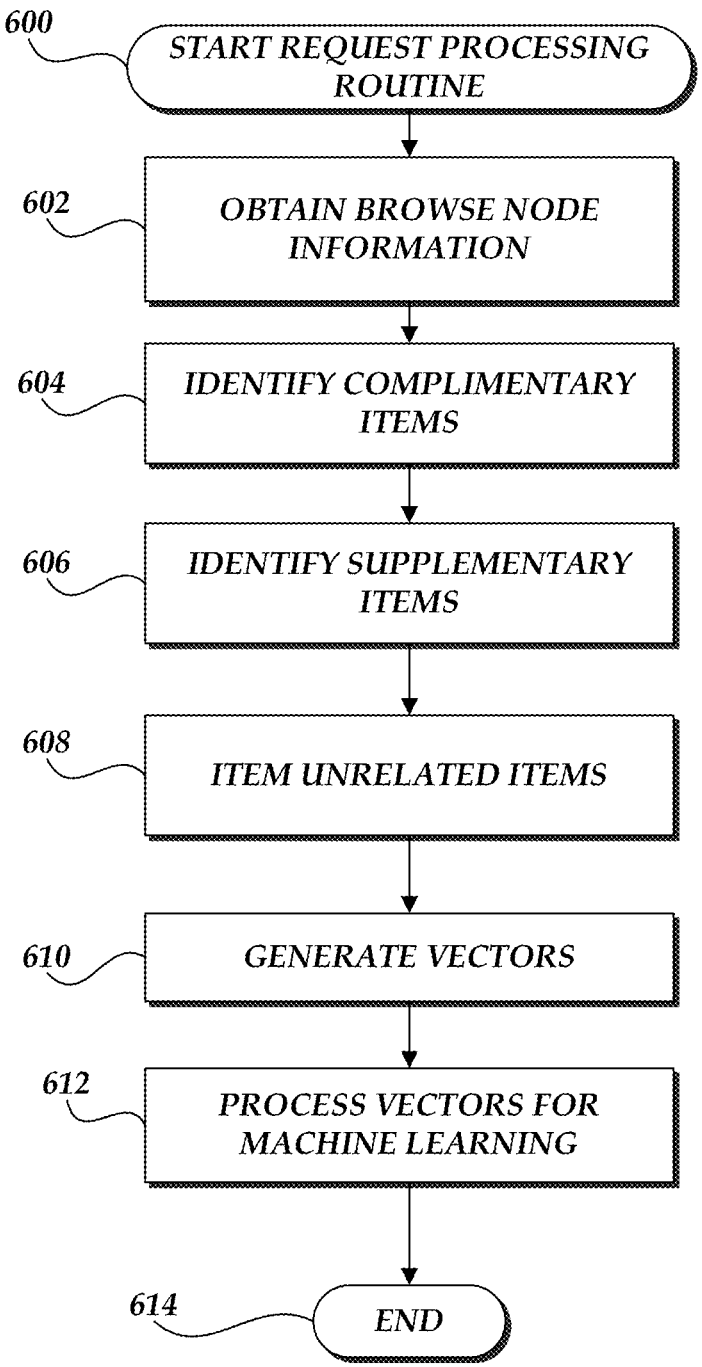
FIG. 6 is a flow diagram illustrative of an item association vector generation routine implemented by a computing device in accordance with the present application.

FIG. 6 is a flow diagram illustrative of an item association vector generation routine 600 implemented by a computing device in accordance with the present application. Illustratively, routine 600 may be implemented by the recommendation service 112, as described above for purposes of processing recommendation requests. One or more aspects of routine 600 may be implemented to process other types of requests, such as search result processing or prioritization. At block 602, the recommendation service 112 obtains catalog information for a set of items, such as browse node information for at least a subset of an item catalog. As previously described, the browse node information identifies a hierarchical organization of one or more items in the catalog organized by hierarchical criteria. For example, in the context of a catalog of items for sale, the browse tree nodes can correspond to categories of items. The catalog information can include historical information such as purchase information, browsing information, search terms, or other user interaction information that can be utilized to generate association vectors as described herein.

At blocks 604-606, the recommendation service 112 processes the catalog information to determine one or more unique association vectors for items. Illustratively, the association vectors can correspond to a quantization of relationships between items in the catalog. At block 604, the recommendation service 112 identifies and associates a quantization value for complementary items. A determination of complementary items can be based on items within a common browse node that are purchased together in a statistically significant manner. Additional inputs, such as meta-data or manual classification from the service provider or additional their parties may also be utilized. At block 606, the recommendation service identifies and associates a quantization value for substitute items. A determination for substitute items can be based on browsing session information or search term information to identify items that may be considered substitutes or are otherwise interchangeable. At block 608, the recommendation service 112 identifies items that are unrelated or considered noise. Unrelated items can be based on items included in the catalog but not associated with a selected browse node. For example, for a browse node regarding apparel, all items not include in the apparel browse node of the catalog, such as food items, could be considered unrelated and be associated with a quantization value associated with such a characterization.

At block 610, the recommendation service 112 can generate vectors of quantization values for various browse nodes or portions thereof. Illustratively, the vector can include one or more rows and one or more columns of items in a browser node. For each row, a set of quantization values are provided for the relationship between an identified item in the browse node and additional items in the browse node (e.g., the columns of items). For example, in a browse node corresponding to hair care products can include rows and columns of quantization values for the relationships between shampoos, conditioners, oils, gels, and the like. Illustratively, the quantization values can be provided to distinguish between different types or characterizations of the relationships, such as complementary, substitute or noise. The quantization values can also reflect a degree of confidence for the characterization of the relationship. The generation of the quantization values may be done automatically by the recommendation service 112, such as by processing the catalog information and correlating the purchase history information. In other embodiments, the recommendation service 112 can utilize manual specification of the quantization values or manual adjustment of calculated quantization values. In embodiments in which there may be multiple association vectors, the recommendation service 112 can include identification information or selection information that facilitates identification of applicable association vectors.

At block 612, the recommendation service 112 utilizes the generated association vectors to train a machine learning algorithm. Illustratively, the machine learning algorithm can be trained with the association vectors for the recommendation service 112 to identify item recommendations from an item-to-item contextual recommendation that would be considered possible noise (e.g., brownie mix and hammers). In another embodiment, the machine learning algorithm can be trained to identify item recommendations from an item-to-item contextual recommendation that would be considered complementary. In a further embodiment, the machine learning algorithm can be trained to identify item recommendations from an item-to-item contextual recommendation that would be considered a substitute. As previously described, once trained, the recommendation service 112 can utilize the trained machine learning algorithm to filter a set of recommendations to remove items considered to be noise or to prioritize items identified as complementary or a substitute. At block 614, the routine 600 terminates.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
   receiving, by a recommendation service computing device, a request for recommendations based on an identifiable user;
   obtaining, by the recommendation service computing device, information identifying a set of items;
   for individual items in the set of items, generating, by the recommendation service computing device, one or more of:

first quantization values for items characterized as complementary to the item;
second quantization values for items characterized as a substitute for the item; and
third quantization values for items characterized as non-related to the item;
generating, by the recommendation service computing device, one or more association vectors based on the generated quantization values;
training, by the recommendation service computing device, a machine learning algorithm according to the generated one or more association vectors, wherein the machine learning algorithm generates outputs corresponding to one of more of the first, second, and third quantization values;
identifying, by the recommendation service computing device, a set of recommended items from the set of items;
filtering, by the recommendation service computing device, at least one item from the set of recommended items based on an output from the machine learning algorithm; and
transmitting, by the recommendation service computing device, the filtered set of recommendations responsive to the request for recommendations based on the identifiable user.

2. The computer-implemented method as recited in claim 1, wherein quantization values are generated for complementary items based on a purchase history.

3. The computer-implemented method as recited in claim 1, wherein quantization values are generated for substitute items based on a session history.

4. The computer-implemented method as recited in claim 1, wherein quantization values are generated for non-related items based on a hierarchical organization of items.

5. The computer-implemented method as recited in claim 1 further comprising prioritizing, by the recommendation service computing device, at least one item identified by the machine learning algorithm as at least one of complementary or a substitute.

6. The computer-implemented method as recited in claim 1, wherein generating one or more association vectors based on the generated quantization values includes automatically generating the one or more association vectors.

7. The computer-implemented method as recited in claim 1, wherein generating one or more association vectors based on the generated quantization values includes causing a manual modification of the generated one or more association vectors.

8. The computer-implemented method as recited in claim 1, wherein generating one or more association vectors based on the generated quantization values includes generating a plurality of association vectors based on one or more subsets of users.

9. A system comprising:
a memory; and
a processor in communication with the memory, wherein the processor executes computer-executable instructions stored in the memory to perform operations including:
receiving, from a content provider service computing device, a request for recommendations based on an identifiable user, wherein the content provider service computing device receives requests for content from a plurality of client computing devices, and wherein at least one client computing device of the plurality of client computing devices is associated with the identifiable user;
obtaining catalog information identifying a set of items and defining a set of hierarchical browse nodes that associate sets of items according to a characteristic;
for individual items in the set of items,
generating first quantization values for items characterized as complementary to the item;
generating second quantization values for items characterized as a substitute for the item; and
generating third quantization values for items characterized as non-related to the item;
generating one or more association vectors based on the first, second, and third quantization values;
training a machine learning algorithm according to the generated one or more association vectors, wherein the machine learning algorithm generates outputs corresponding to the first, second, and third quantization values;
generating a set of recommended items from the catalog;
filtering at least one item from the generated set of recommended items based on an output from the machine learning algorithm; and
transmitting the filtered set of recommended items responsive to the request from the content provider service computing device.

10. The system as recited in claim 9, wherein the items characterized as complementary to the item are characterized based at least in part on purchase history information.

11. The system as recited in claim 9, wherein the items characterized as a substitute for the item are characterized based at least in part on session history information.

12. The system as recited in claim 9, wherein the processor executes further computer-executable instructions stored in the memory to perform operations including:
prioritizing the set of recommended items based at least in part on an identification of at least one complementary item or substitute item.

13. A non-transitory computer-readable medium including computer-executable instructions that, when executed by a computing system, cause the computing system to:
generate one or more of:
first association vectors based on generated first quantization values, the first quantization values based on a characterization of complementary relationships between individual items of a set of items;
second association vectors based on generated second quantization values, the second quantization values based on a characterization of substitute relationships between individual items of a set of items; and
third association vectors based on generated third quantization values, the third quantization values based on a characterization of non-relationships between individual items of a set of items;
train a machine learning algorithm according to the generated one or more association vectors to generate outputs corresponding to one or more of the first, second, and third association vectors; and
transmit a processed set of recommendations in response to a request for a set of recommendations, the processed set of recommendations generated based at least in part on an output of the machine learning algorithm.

14. The non-transitory computer-readable medium of claim 13 including further computer-executable instructions that, when executed by the computing system, cause the computing system to obtain the request for a set of recommendations based on one or more identifiable users.

15. The non-transitory computer-readable medium of claim 14 including still further computer-executable instructions that, when executed by the computing system, cause the computing system to generate the processed set of recommendations based at least in part on the output of the machine learning algorithm.

16. The non-transitory computer readable medium of claim 15, wherein the processed set of recommendations includes at least one of filtered or prioritized recommendations based on the output from the machine learning algorithm.

\* \* \* \* \*